(No Model.)
J. SANDAGE.
WAGON AXLE SKEIN.
No. 597,692. Patented Jan. 18, 1898.
Fig.1
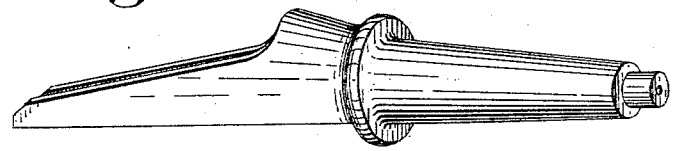
Fig.2
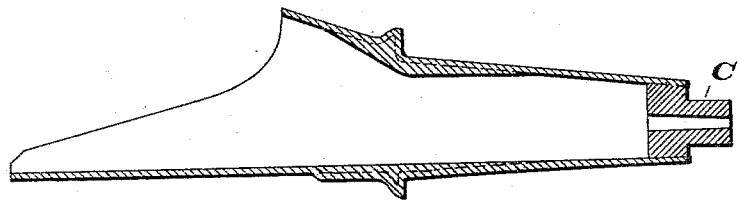
Fig.3
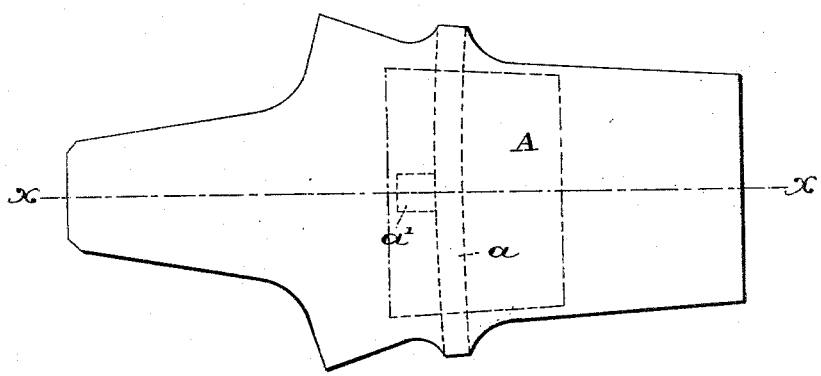
Fig.4
Fig.5
Fig.6
Witnesses:- Inventor:
Joshua Sandage
By his Atty:-
THE NORRIS PETERS CO., PHOTO-LITHO., WASHINGTON, D. C.

UNITED STATES PATENT OFFICE.

JOSHUA SANDAGE, OF SOUTH BEND, INDIANA.

WAGON-AXLE SKEIN.

SPECIFICATION forming part of Letters Patent No. 597,692, dated January 18, 1898.

Application filed May 17, 1897. Serial No. 636,877. (No model.)

*To all whom it may concern:*

Be it known that I, JOSHUA SANDAGE, a citizen of the United States, residing at South Bend, in the county of St. Joseph and State of Indiana, have invented certain new and useful Improvements in Wagon-Axle Skeins, of which the following is a specification.

My invention relates to the manufacture of thimble-skeins from a single sheet of metal stamped up and welded and having but a single longitudinal seam.

The object of my present invention is to reinforce the skein at the collar in an improved manner, the supplemental parts of the single plate being welded thereto in a solid integral mass.

Heretofore axle-skeins made with a sheet-metal body have been provided with a separate collar-piece of rolled plate material welded together at its ends and then shrunk onto the skein or by a separate malleable collar shrunk onto the skein, and similar other methods of reinforcement of the skein have been experimented with and proved to be defective in material respects.

My present invention consists in providing the skein made of a sheet-metal blank with a reinforcing plate or plates welded thereto upon said blank during the process of manufacturing of the skein, as will hereinafter appear.

In the accompanying drawings, Figure 1 is a perspective view of the axle-skein forging complete; Fig. 2, an enlarged longitudinal section thereof; Fig. 3, a plan of the sheet-metal axle blank or plate after it has been cut and before stamping, the dotted lines representing the collar and checked recesses formed therein during the process of manufacture and the broken lines representing the reinforcing-plate adapted thereto before welding; Fig. 4, a longitudinal section in line $xx$ of Fig. 3, with the reinforcing-plate shown by broken lines thereon; Fig. 5, a transverse section of the single and preferred form of reinforcing-plate, and Fig. 6 a similar section of two separate reinforcing-plates which may be used in lieu of the plate shown by cross-section in Fig. 5.

The blank A, from which to form the skein, is by the preferred method cut to the proper form, as shown in Fig. 3, preferably from plate-steel, and is then heated and placed upon the forming-dies under the hammer or in a suitable machine, the first operation forming the recess $a$ for the collar and also forming a slight adjacent clip-check or stop-recess $a'$, extending inwardly therefrom and which allows the said blank to recede under said welding process until the central line of the blank is brought down to a straight line, as shown in the longitudinal section, Fig. 3, of the finished skein-forging. This provision for a straight line or base-line of the wooden axle to be fitted into the skein is a most desirable object, as the wooden axles should always have a straight base-line to work from, and any fullness in the blank at this point would prevent the skein from being fitted freely and truly thereon.

After the blank A has been heated and forged to the form just described and shown by cross-section in Fig. 4 the reinforcing-plate B, as shown in Fig. 5, is placed upon the blank A, as shown by broken lines in Figs. 3 and 4, and the two plates are welded together in a solid mass. When special forms and a varied degree of reinforcement is to be effected, the flat plate portion $b$ is placed upon the bar $b'$ and the latter fitted into the collar-recess $a$ of the blank A, and said parts are all welded solidly together, thus reinforcing that portion of the blank which is subsequently forged and welded together to form the collar, the skein-shoulder, and the inner end of the journal at its point of union with the collar, these parts of the skein being subjected to a much greater strain, and consequently require greatly increased strength over the end portions of the skein.

After the skein-blank has been reinforced, as above described, it is properly heated and placed upon a suitable die, which at one blow turns up the sides of the blank to form the said blank U-shaped in cross-section, and is then forged with a longitudinal lap-seam extending the full length of the upper side thereof by means of a suitable mandrel and dies to the form of a tubular skein, the latter being then supplied at its forward end with a plug C, of suitable form and material and welded therein, all in a well-known manner, to form a sheet-metal skein having a reinforced collar-shoulder and adjacent journal end, thus materially strengthening and improving in the most material manner the skein structure. The additional thickness thus given to the rear end of the journal portion of the skein adds greatly to the life or wear of the skein, the latter always wearing thin and in time wearing completely through and destroying the skein at a distance extending an inch and a half or more from said collar, as the hub-box is usually cut away at this point, in the middle of the journal. The end portion of the box receives the bearing and wear of the solid welded end portion of the skein, which is reinforced by the plug C. It will not wear out at the outer end, and by simply reinforcing the middle portion of the skein, as above described, a very light, strong, and durable skein is provided of a sheet or sheets of steel or iron of a single body-piece welded together integral with the reinforcement and end plug.

The end plug and outer end or shoulder of the skein-journal is cut off to the proper size and form and finished in every particular substantially like the axle-skeins of this class in general use, and possessing much greater strength at the vital points will not break down or wear out so easily as skeins made from a single unreinforced plate.

It is evident that the blank may be forged, rolled, or stamped up from the bloom or otherwise formed in a single plate or blank of the general outline shown in Fig. 3 and reinforced in thickness at the parts indicated to provide the skein with the desired reinforcement without the employment of a separate plate or plates welded thereon; but the latter form, as herein particularly described, has been found to be the most economical and effective method for producing an axle-skein such as herein described and claimed.

I claim as my invention and desire to secure by Letters Patent—

1. An article of manufacture, an axle-skein made from a single body-plate of sheet metal reinforced internally at the collar by a separate piece welded thereto, and then forged and lapwelded together at their marginal edges by a single longitudinal seam, substantially as described.

2. An axle-skein made of rolled metal plate welded together at its longitudinal edges, a recess in the interior thereof at the collar, and a separate piece welded therein, the said piece having side flanges to reinforce the skein upon each side of the collar, substantially as described.

In testimony that I claim the foregoing as my invention I have signed my name in the presence of two subscribing witnesses.

JOSHUA SANDAGE.

Witnesses:
WM. H. ROWE,
B. KRUEPER.